United States Patent
Pulido

(10) Patent No.: US 7,849,457 B1
(45) Date of Patent: Dec. 7, 2010

(54) PROCESS FOR AUTOMATIC & UNATTENDED FORMATTING AND RE-INSTALLATION OF OPERATIVE SYSTEM, OS UPDATES, DRIVERS AND RE-INSTALLATION OF SOFTWARE APPLICATIONS, LAUNCHED FROM A WEBSITE AS A DIGITAL SERVICE

(76) Inventor: Juan Pulido, 645 G St., Suite 100-842, Anchorage, AK (US) 99501

( * ) Notice: Subject to any disclaimer, the term of this patent is extended or adjusted under 35 U.S.C. 154(b) by 1266 days.

(21) Appl. No.: 11/407,472

(22) Filed: Apr. 20, 2006

(51) Int. Cl.
 *G06F 9/45* (2006.01)
(52) U.S. Cl. ...................................................... 717/173
(58) Field of Classification Search .................. 717/173
 See application file for complete search history.

(56) References Cited

U.S. PATENT DOCUMENTS

| | | | | |
|---|---|---|---|---|
| 3,517,171 | A * | 6/1970 | Avizienis | 714/10 |
| 5,742,829 | A * | 4/1998 | Davis et al. | 717/178 |
| 6,282,712 | B1 * | 8/2001 | Davis et al. | 717/170 |
| 6,763,458 | B1 * | 7/2004 | Watanabe et al. | 713/100 |
| 7,203,861 | B1 * | 4/2007 | Asano | 714/6 |
| 7,302,608 | B1 * | 11/2007 | Acharya et al. | 714/13 |
| 7,318,148 | B2 * | 1/2008 | Scheibli | 713/1 |
| 7,353,428 | B2 * | 4/2008 | Cheston et al. | 714/38 |
| 7,571,353 | B2 * | 8/2009 | Largman et al. | 714/36 |
| 7,577,949 | B2 * | 8/2009 | Barr et al. | 717/169 |
| 7,640,368 | B2 * | 12/2009 | Kim et al. | 710/8 |
| 2002/0046365 | A1 * | 4/2002 | Avizienis | 714/43 |
| 2002/0166045 | A1 * | 11/2002 | Fleming, III | 713/1 |
| 2005/0091349 | A1 * | 4/2005 | Scheibli | 709/222 |
| 2006/0161915 | A1 * | 7/2006 | Barr et al. | 717/174 |
| 2006/0168576 | A1 * | 7/2006 | Phung et al. | 717/168 |
| 2007/0220308 | A1 * | 9/2007 | Yeung et al. | 714/5 |

* cited by examiner

*Primary Examiner*—John Chavis
(74) *Attorney, Agent, or Firm*—Michael J. Tavella

(57) ABSTRACT

A software/website system that allows a user to resolve software-related problems on a PC remotely via a web site. The system then uses a software package that automatically erases the contents of the computer's hard drive and then automatically reinstalls the Operating System and all requested applications in a fully unattended way. During the process, all programs needed for a complete and functional PC are automatically installed. As part of the process, the program updates and installs program patches. It then prompts a message to the user that it has finished. The result is a computer that performs at optimal speed and efficiency and with little to no effort on the user's part.

8 Claims, 33 Drawing Sheets

MainEraseAutoRepExeOnCDExeAutoRepPostCDExeFromCandStartUpandARComIfPresent
    Cleanup process system folder from unwanted resources left from previous use of process.

MainDisableSystemTrayBaloonNotifications
    Get rid of standard operating system balloon notifications to provide service a clean environment for further needs.

MainCheckForAllPowerRequirements
    Make sure that user's PC plugged to permanent power source MainCheckForInternetConnectionRequirements
    Make sure user's PC has an internet access ShowItselfandFocusItself 'Hides Shows then focus
    Bring graphical interface on top of the computer desktop.

MainLookForLocalServer
    Look for local network server.

MainLookForGlobalServer
    Look for currently available global severs.

MainSetCurrentServer
    Establish connection to the server that appears to be most reliable for current session of the process.

If (ARCom2ndPartitionOperation = "1") Then
MainReducePartitionAndRebootPCIfRequired
    If user requested to create second(backup) partition then run external application to reduce size of main partition(make space available for new partition creation) and reboot the PC to apply these changes If (ARCom2ndPartitionOperation = "1") Then
MainCreateFormatAndMountPartitionIfRequired
    Create second partition on the free space provided from operation above.

MainLookForARComInOtherDrivesAndSyncFromThemIfPresent
    Check if user's PC used process before, find out if there are any valid resources left on backup drives and copy them into current system folder using process's "Synchronize" technology.

MainShareDrivesIfRequired
    Set file shearing settings of computer drives and folder as it was requested by user MainSharePrintersIfRequired
    Share printers if it was requested by user MainLookForOSImage
    Look if OS.iso is present on other drives Maindownloadosimageifnotpresent
    Check if OS.iso is present in process system folder and download it if it is missing.

MainSyncFilesToOtherDrivesIdPresent
    Copy process system folder to other drives(if present) using process's "Synchronize" technology.

MainDuplicateOSImageFile
    Create a copy of OS.iso

MainApplyBackground
    Set operatin system desktop background to Exclusive AutomaticRepair.com background 'MainDownloadRequiredSupportFiles
    Download required support files.

FreewareHasBeenInstalled = "No"
    Assign global which is responsible for freeware installation to "No"

MainVerifyProperEnviroment
    Close undesired applications and allow critical system processes to be finished before continue .

MainErasingTemporaryFiles
    Get rid of unwanted temporary file left over during the process Home
News
About Us
Services
Products
Contact Us
Downloads
Account
Automatic Repair.com Full Name: Phillip Bach
Email: bach@asotek.com
Phone: (907) 277-1206
Company Name: Denali Vision Clinic
Job Title: Owner
Country: US
State: AK
City: Anchorage
Address 1: 1440 W 10th Ave
Address 2:
Zip Code: 99501

Automatic Repair.com

☐ Legal Info
☐ About Site
☐ Privacy Info
News

☐ Edit your information ☐ Automatic Repair.com ☐ Product catalog ☐ Log off

| | | |
|---|---|---|
| ☐ Microsoft MSN Messenger | Description End User Agreement | ☒ I Agree To Install |
| ☐ Microsoft Journal Viewer | Description End User Agreement | ☒ I Agree To Install |
| ☐ Adobe Acrobat Reader | Description End User Agreement | ☒ I Agree To Install |
| ☐ Apple QuickTime | Description End User Agreement | ☒ I Agree To Install |
| ☐ ICQ ICQ | Description End User Agreement | ☒ I Agree To Install |
| ☐ Macromedia Flash Player | Description End User Agreement | ☒ I Agree To Install |
| ☐ NullSoft WinAmp | Description End User Agreement | ☒ I Agree To Install |
| ☐ RARLab WinRAR | Description End User Agreement | ☒ I Agree To Install |
| ☐ Real RealPlayer | Description End User Agreement | ☒ I Agree To Install |
| ☐ Microsoft JVM | Description End User Agreement | ☒ I Agree To Install |
| ☐ Sun Java | Description End User Agreement | ☒ I Agree To Install |
| ☐ Yahoo Messenger | Description End User Agreement | ☒ I Agree To Install |
| ☐ SisSoft Sandra Lite | Description End User Agreement | ☒ I Agree To Install |
| ☐ Microsoft Windows Media Player | Description End User Agreement | ☒ I Agree To Install |
| ☐ Microsoft .Net Framework 2.0 | Description End User Agreement | ☒ I Agree To Install |
| ☐ Grisoft Free | | |

| Software | | |
|---|---|---|
| Operative Systems | | |
| Windows XP Pro Full OEM: | tp7pf-26t92-vxqw3-m3vdk-23pv3 | |
| Freeware Applications | | |
| Microsoft MSN Messenger: | Yes | |
| Microsoft Journal Viewer: | Yes | |
| Adobe Acrobat Reader: | Yes | |
| Apple QuickTime: | Yes | |
| ICQ ICQ: | Yes | |
| Macromedia Flash Player: | Yes | |
| NullSoft WinAmp: | Yes | |
| RARLab WinRAR: | Yes | |
| Real RealPlayer: | Yes | |
| Microsoft JVM: | Yes | |
| Sun Java: | Yes | |
| Yahoo Messenger: | Yes | |
| SisSoft Sandra Lite: | Yes | |
| Microsoft Windows Media Player: | Yes | |
| Microsoft .Net Framework 2.0: | Yes | |
| Grisoft Free Antivirus: | Yes | |
| Commercial Applications | | |
| Ahead Nero 6 Serial Number: | 1a23-0009-9130-2329-1275-8491 | |
| CyberLink PowerDVD 6 CD-Key: | dxuno-ih8hf-dazhf-hdur5-k9fpr-7e23e | |
| Famatech Remote Administrator 2.2: | 08i5OID1P9ddhN7spX1S0N0FhEEdwxN7jA-tqwTW+u | |
| Macromedia Dreamwaver 8: | wpd800-50430-42732-76546 | |
| Microsoft Office Proffesional 2003: | qvcwy-k4w9r-2bhoj-c42x2-pck26 | |
| Microsoft Visual Studio 6 Enterp: | 450-6623317 | |
| Intuit QuickBooks Pro 2006: | 6821-6494-2489-267 | |
| IQBP 2006 Line 2 - Product Number: | 439-330 | |
| Best Peachtree Complete Acc 2004: | 30901076 | |
| BPCA 2004 Line 2 - | Mat Valley Tile & Stone | |

Figure 12

| | |
|---|---|
| Sun JRVA: | Yes |
| Yahoo Messenger: | Yes |
| SitSoft Sandra Lite: | Yes |
| Microsoft Windows Media Player: | Yes |
| Microsoft .Net Framework 2.0: | Yes |
| Grisoft Free Antivirus: | Yes |

Commercial Applications

| | |
|---|---|
| Ahead Nero 6 Serial Number: | 1a23-0009-9130-2329-1275-8491 |
| CyberLink PowerDVD 6 CD-Key: | dxunb-lh9hf-dazhf-hdur5-k9fpr-7e23e |
| Famatech Remote Administrator 2.2: | 06iSO1D1P9ddhN7spX1S0N0FhEEdwxN7jAhtyWTW+uO |
| Macromedia Dreamweaver 8: | wpd900-50430-42732-76546 |
| Microsoft Office Proffesional 2003: | gvcwy-k4w9r-2bhpj-c42x2-pck26 |
| Microsoft Visual Studio 6 Enterp: | 450-6623317 |
| Intuit QuickBooks Pro 2006: | 6821-6494-24489-267 |
| IQBP 2006 Line 2 - Product Number: | 439-330 |
| Best Peachtree Complete Acc 2004: | 30901076 |
| BPCA 2004 Line 2 - Organization: | Mat Valley Tile & Stone |
| BPCA 2004 Line 3 - Customer ID: | 2596582 |
| BPCA 2004 Line 4 - Registration: | 28455324 |

How do You Connect to the Internet

Directly (example: Cable Modem, DSL with a Router, Clearwire, Outlet in Wall)

With a Wireless Network

| | |
|---|---|
| Provide SSID: | AnlitPreN |
| Do you use WPA? | Yes |
| Network Key: | anlitnetwork |

Figure 13

PreCDSession (CD Compiler Module)

CurrentAnimationModule = 3
    Set specific graphical interface for current step of the process.

MainFormPauseInMiliseconds = 100
    Set specific internal delay in between every function of current step.

MainForm.Show
    Make graphical interface visible

ExecutePreLauchSubRutines
    Assign Constants, Create Program Folder

Verify640480Resolution
    Assign Resolution to 640 X 480 for operations standardization MainCheckRunningLocationandCopyAutoRepexeToCARComandRunIfNotThere
    Make sure that the process is running from standard location on user's PC MainReadWebSiteDataIntoARComGlobals
    Communicate with database for internal and security needs of the process.

MainCollectComputerSettings
    Collect Computer Name, Workgroup, Resolution, Favorites of user's PC MainCloseExternalApplications
    Purify working environment for the process. Shut down unimportant external applications running. Exit all unwanted services and tasks.

ShowItselfandFocusItself
    Bring graphical interface on top of the computer desktop.

MainEraseAutoRepExeOnCDExeAutoRepPostCDExeFromCandStartUpandARComIfPresent
    Cleanup process system folder from unwanted resources left from previous use of process.

MainDisableScreenSavers
    Set user's screen saver settings to "none" in order to protect process from being interrupted in any of further steps.

MainDisablePowerSavingOptions
    Set user's power saving settings to "ARCom" power scheme in order to protect process from being interrupted in any of further steps.

Figure 17a

MainAssignTimeWhenRepairStarted
    Let process know at what time it was initiated. One of the Security needs.

MainLookForDepencenciesandCreateThemIfNotPresent
    Check for external system files used by process and create them if not it appears that they don't exist.

MainLookForARComInOtherDrivesAndSyncFromThemIfPresent
    Check if user's PC used process before, find out if there are any valid resources left on backup drives and copy them into current system folder using process's "Synchronize" technology.

MainFirewallDisable
    Open communication ports required for remote assistance.

MainCheckForAllDeviceRequirements
    Make sure that user's PC has all hardware devices properly recognized and enabled in order to obtain valid drivers for each hardware device.

MainCheckForAllPowerRequirements
    Make sure that user's PC plugged to permanent power source.

MainCheckForAllCDRequirements 'Blank CD
    Make sure that user's PC has an empty CD for process needs.

MainCheckForInternetConnectionRequirements 'Check That PC Is Online
    Make sure user's PC has an internet access.

ShowItselfandFocusItself
    Bring graphical interface on top of the computer desktop.

MainLookForLocalServer
    Look for local network server.

MainLookForGlobalServer
    Look for currently available global severs.

ShowItselfandFocusItself
    Bring graphical interface on top of the computer desktop.

MainSetCurrentServer
    Establish connection to the server that appears to be most reliable for current session of the process.

Figure 17b

MainLookForOSImage
    Look if OS.iso is present on other drives.

MainChangeCaptionToUnattendedMode
    Change main caption of graphical interface to Unattended Mode Caption.

Maindownloadosimageifnotpresent
    Check if OS.iso is present in process system folder and download it if it is missing.

MainDuplicateOSImageFile
    Create a copy of OS.iso for safety purposes.

MainLookForUpdateFilesAndDownloadThemIfNotPresent
    Check if Windows updates files are present in process system folder and download them if they are missing.

MainLookForRequiredTools
    Check if external applications used by the process are present.

MainDownloadAndInstallRequiredToolsIfNotPresent
    Download and install external applications in case they were missing.

MainDownloadModelWINNTSIF
    Download a model answer file which is a file that will provide all the required inputs during the operative system installation making it unattended MainDownloadOnCD
    Download application that runs Next part of the process (OnCD.exe)

MainCreateCustomAnserFile
    Modify model answer file to make it unique for every computer.

MainSaveCurrentDrivers
    Get proper drivers for all present and plugged hardware devices of user's PC and save them.

MainCheckForOpticalDrives
    Obtain information about all present optical drives of user's PC.

Figure 17c

MainAssignTimeWhenBurningStarted
> Let process know at what time CD burn was initiated. Mandatory Security need for "CD Time Stamp" technology.

MainCreateARCOMAutoRepAARFromGlobals
> Create an answer file from all important information about user's PC obtained in steps above.

MainCustomizeFiles
> Collect all important files to be burned on CD and create ImmagePlus.iso 'MainExtractDeleteModifyAndInsertCustomRaidBootFile
> Provide drivers for certain model of RAID card in order to provide support for them in initial operating system loading.

MainRecordImagePlusISOinCD
> Burn personalized and modified CD image to the CD.

MainSyncFilesToOtherDrivesIdPresent
> Copy process system folder to other drives(if present) using process's "Synchronize" technology.

MainCheckIfRecordingWasSuccesfull
> Make sure CD was burned properly, all files are readable and exit if these requirements were not met.

If (ARCom2ndPartitionProtection = "1") Then
MainLookforHided2ndPartitionandUnHideifPresent
> Look which option user chooses for Protect / Don't Protect 2$^{nd}$ partition. If "Don't protect 2$^{nd}$ partition" was chosen then use an external tool to make all partitions visible. And by then make them a subject to be wiped out.

If (ARCom2ndPartitionProtection = "2") Then
MainLookfor2ndPartitionsandHideifPresent
> Look which option user chooses for Protect / Don't Protect 2$^{nd}$ partition. If "Protect 2$^{nd}$ partition" was chosen then use an external tool to make secondary(backup) partition hidden. And by then Protect it from beein wiped out.

MainRemovingBootRecords
> Use external tool to remove boot records from HD so computer will not have any other choice then boot up from CD.

Figure 17d

MainRebootingComputer
  Reboot the computer to apply changes in boot record.

ExitAutoRepexe
  ...

Figure 17e

On CD Session (System Setup Module)

CurrentAnimationModule = 4
        Set specific graphical interface for current step of the process.

MainFormPauseInMiliseconds = 100
        Set specific internal delay in between every function of current step.

ExecutePreLauchSubRutines 'Assign Constants, Create Program Folder
        Assign Constants, Create Program Folder DisableMainExitButton
        Make EXIT button of graphical interface unavailable for use Verify640480Resolution
        Assign Resolution to 640 X 480 for operations standardization ShowItselfandFocusItself 'Hides Shows then focus
        Bring graphical interface on top of the computer desktop.

'DisableCtrlAltDel
        Make graphical interface protected from being interuptep by pressing
        Ctrl + Alt + Del keys 'LockMouseMovement
        Make physical mouse movements being ignored by process MainCheckForComputerIdentity
        Identify if user's computer pass "PC Exclusive" technology test that will
        make sure that process is running on the same computer as it was first
        initiated on.

MainVerify Proper Enviroment
        Close undesired applications and allow critical system processes to be
        finished before continue MainReadAutoRepAARFromCD
        Assign global values that were saved from previous step of the process to
        the text file on CD.

'///////PENDING 'MainAuthorizeOnCDOrBlock 'Pending to Improve USE Hard, Time

Figure 18a

'MainEnableCtrlAltDel
    Make graphical interface respond if Ctrl + Alt + Del keys were pressed.

'MainUnlockMouseMovement
    Make process recognize physical mouse movements.

MainEnableExitButton
    Make EXIT button of graphical interface available for use MainLookForDepencenciesandCreateThemIfNotPresent
    Check for external system files used by process and create them if not it appears that they don't exist.

MainVerifyProperEnviroment
    Close undesired applications and allow critical system processes to be finished before continue MainCheckRunningLocationandCopyOnCDexeToCARComandRunIfNotThere
    Make sure that the process is running from standard location on user's PC.

MainDisableScreenSavers
    Set user's screen saver settings to "none" in order to protect process from being interrupted in any of further steps.

MainDisablePowerSavingOptions
    Set user's power saving settings to "ARCom" power scheme in order to protect process from being interrupted in any of further steps.

MainApplyTempBackground
    Apply Temporary Background for operating system desktop.

MainVerifyProperEnviroment
    Close undesired applications and allow critical system processes to be finished before continue.

MainCloseExternalApplications
    Get rid of unwanted applications running on the background MainFirewallDisable
    Open communication ports required for remote assistance.

Figure 18b

MainEraseAutoRepExeOnCDExeAutoRepPostCDExeFromCandStartUpandARComIfPresent
    Cleanup process system folder from unwanted resources left from previous use of process.

MainDisableSystemTrayBaloonNotifications
Get rid of standard operating system balloon notifications to provide service a clean environment for further needs.

MainReplaceFavoritesWithCDFavorites 'IE
    Setup Favorites folder of 'internet explorer' to math the one that user had before the cleanup.

MainLookforOnCDRequiredToolsandInstallIfNotPresent
    Make sure that current step has all important tools to continue process.

ShowItselfandFocusItself
    Bring graphical interface on top of the computer desktop.

MainLookfor2ndPartitionsandUnHideIfRequired
    If secondary(backup) partition was saved from being wiped out by previous step of the process, make it visible for the operating system MainInstallUpdatesFromCDAndRebootPCIfRequired
    Install operating system latest updates and reboot computer if they were not present before.

MainInstallDriversFromCDandRebootPCIfRequired
    Install previously saved drivers of user's PC.

MainConnectToNetworks
    Obtain connection to the internet for further uses of process.

MainCreateAndConnectPPPoEIfRequired
    Connect to DSL connection if such was provided.

MainLookForLocalServer
    Look for local network server.

MainLookForGlobalServer
    Look for currently available global severs.

Figure 18c

MainSetCurrentServer
> Establish connection to the server that appears to be most reliable for current session of the process.

MainDownloadPostCD
> Download executive of next step of the process.

MainLaunchPostCD
> Lunch next step of the process that was downloaded above.

ExitAutoRepexe...

Figure 18d

Post CD Session (Application Module)

ExecutePreLauchSubRutines
    Assign Constants, Create Program Folder if such dose not exists.

MainFormPauseInMiliseconds = 100
    Set specific internal delay in between every function of current step.

CurrentAnimationModule = 5
    Set specific graphical interface for current step of the process.

DisableMainExitButton
    Make EXIT button of graphical interface unavailable for use Verify640480Resolution
    Assign Resolution to 640 X 480 for operations standardization ShowItselfandFocusItself 'Hides Shows then focus
    Bring graphical interface on top of the computer desktop.

'DisableCtrlAltDel 'Later
    Make graphical interface protected from being interuptep by pressing
    Ctrl + Alt + Del keys.

'LockMouseMovement
    Make physical mouse movements being ignored by process

'MainCheckForComputerIdentity
    Identify if user's computer pass "PC Exclusive" technology test that will
    make sure that process is running on the same computer as it was first
    initiated on.

MainReadAutoRepAARFromCD
    Assign global values that were saved from previous step of the process to
    the text file on CD.

ShowItselfandFocusItself 'Hides Shows then focus
    Bring graphical interface on top of the computer desktop.

'MainAuthorizeOnCDOrBlock 'Pending to Improve

'MainEnableCtrlAltDel
    Make graphical interface respond if Ctrl + Alt + Del keys were pressed

Figure 19a

'MainUnlockMouseMovement 'Later
    Make process recognize physical mouse movements.

MainEnableExitButton
    Make EXIT button of graphical interface available for use MainLookForDepencenciesandCreateThemIfNotPresent
    Check for external system files used by process and create them if not it appears that they don't exist MainVerifyProperEnviroment
    Close undesired applications and allow critical system processes to be finished before continue.

MainCheckRunningLocationandCopyPostCDToCARComandRunIfNotThere
    Make sure that the process is running from standard location on user's PC.

MainReadWebSiteDataIntoARComGlobals
    Communicate with database for internal and security needs of the process.

MainDisableScreenSavers
    Set user's screen saver settings to "none" in order to protect process from being interrupted in any of further steps.

MainDisablePowerSavingOptions
    Set user's power saving settings to "ARCom" power scheme in order to protect process from being interrupted in any of further steps.

MainCloseExternalApplications
    Purify working environment for the process. Shut down unimportant external applications running. Exit all unwanted services and tasks.

MainFirewallDisable
    Open communication ports required for remote assistance.

MainEnableFileSharingIfRequired
    Enable File Shearing

Figure 19b

MainEraseAutoRepExeOnCDExeAutoRepPostCDExeFromCandStartUpandARComIfPresent
    Cleanup process system folder from unwanted resources left from previous use of process.

MainDisableSystemTrayBaloonNotifications
    Get rid of standard operating system balloon notifications to provide service a clean environment for further needs.

MainCheckForAllPowerRequirements
    Make sure that user's PC plugged to permanent power source MainCheckForInternetConnectionRequirements
    Make sure user's PC has an internet access ShowItselfandFocusItself 'Hides Shows then focus
    Bring graphical interface on top of the computer desktop.

MainLookForLocalServer
    Look for local network server.

MainLookForGlobalServer
    Look for currently available global severs.

MainSetCurrentServer
    Establish connection to the server that appears to be most reliable for current session of the process.

If (ARCom2ndPartitionOperation = "1") Then
MainReducePartitionAndRebootPCIfRequired
    If user requested to create second(backup) partition then run external application to reduce size of main partition(make space available for new partition creation) and reboot the PC to apply these changes If (ARCom2ndPartitionOperation = "1") Then
MainCreateFormatAndMountPartitionIfRequired
    Create second partition on the free space provided from operation above.

Figure 19c

MainLookForARComInOtherDrivesAndSyncFromThemIfPresent
    Check if user's PC used process before, find out if there are any valid resources left on backup drives and copy them into current system folder using process's "Synchronize" technology.

MainShareDrivesIfRequired
    Set file shearing settings of computer drives and folder as it was requested by user MainSharePrintersIfRequired
    Share printers if it was requested by user MainLookForOSImage
    Look if OS.iso is present on other drives Maindownloadosimageifnotpresent
    Check if OS.iso is present in process system folder and download it if it is missing.

MainSyncFilesToOtherDrivesIdPresent
    Copy process system folder to other drives(if present) using process's "Synchronize" technology.

MainDuplicateOSImageFile
    Create a copy of OS.iso

MainApplyBackground
    Set operatin system desktop background to Exclusive AutomaticRepair.com background 'MainDownloadRequiredSupportFiles
    Download required support files.

FreewareHasBeenInstalled = "No"
    Assign global which is responsible for freeware installation to "No"

MainVerifyProperEnviroment
    Close undesired applications and allow critical system processes to be finished before continue .

MainErasingTemporaryFiles
    Get rid of unwanted temporary file left over during the process

Figure 19d

Next block installs all the freeware requested by user.

If (ARComInstallMicrosoftJVM = "Yes") Then MainMicrosoftJVMSetup

If (ARComInstallSunJava = "Yes") Then MainSunJavaSetup

If (ARComInstallMicrosoftMSNMessenger = "Yes") Then
MainMicrosoftMSNMessengerSetup If (ARComInstallMicrosoftJournalViewer = "Yes") Then
MainMicrosoftJournalViewerSetup If (ARComInstallAdobeAcrobatReader = "Yes") Then MainAdobeAcrobatReaderSetup If (ARComInstallAppleQuickTime = "Yes") Then MainAppleQuickTimeSetup If (ARComInstallICQICQ = "Yes") Then MainICQICQSetup If (ARComInstallMacromediaFlashPlayer = "Yes") Then
MainMacromediaFlashPlayerSetup If (ARComInstallNullSoftWinAmp = "Yes") Then MainNullsoftWinAmpSetup If (ARComInstallRARLabWinRAR = "Yes") Then MainRarLabWinRARSetup If (ARComInstallRealRealPlayer = "Yes") Then MainRealRealPlayerSetup If (ARComInstallYahooMessenger = "Yes") Then MainYahooMessengerSetup If (ARComInstallSisSoftSandraLite = "Yes") Then MainSisSoftSandraLiteSetup If (ARComInstallMicrosoftMediaPlayer = "Yes") Then MainMicrosoftMediaPlayerSetup If (ARComInstallMicrosoftDotNetFramework = "Yes") Then
MainMicrosoftDotNetFrameworkSetup If (ARComInstallGrisoftFreeAntivirus = "Yes") Then MainGrisoftFreeAntivirusSetup

'////////// REBOOT

Figure 20a

```
If (FreewareHasBeenInstalled = "Yes") Then
MainPlaceProgramInStartUpAndRebootPCIfFreewareHasBeenInstalled

'////////// COMMERCIAL GROUP 000001

ComercialSoftwareFromGroup000001HasBeenInstalled = "No"

If (Len(ARComMicrosoftVisualStudio6Enterprise) = 11) Then
MainMicrosoftVisualStudio6Setup If (Len(ARComAheadNero6) = 29) Then MainAheadNero6Setup If (Len(ARComCyberLinkPowerDVD6) = 35) Then MainCyberlinkPowerDVD6Setup If (Len(ARComFamatechRemoteAdministrator22) = 88) Then
MainFamatechRemoteAdministrator22Setup If (Len(ARComMacromediaDreamwaver8) = 24) Then
MainMacromediaDreamweaver8Setup If (Len(ARComMicrosoftOfficeProfessional2003) = 29) Then
MainMicrosoftOffice2003ProfessionalSetup If (Len(ARComIntuitQuickBooksPro2006) = 18) Then
MainIntuitQuickBooksPro2006Setup If (Len(ARComBestPeachtreeCompleteAccounting2004) = 8) Then
MainBestPeachtreeCompleteAccounting2004Setup ""If (Len(ARComMicrosoftVisualStudio2005Professional) = 6) Then
MainMicrosoftVisualStudio2005ProfessionalSetup

'////////// REBOOT

If (ComercialSoftwareFromGroup000001HasBeenInstalled = "Yes") Then
MainPlaceProgramInStartUpAndRebootPCIfComercialSoftwareFromGroup000001HasB
eenInstalled

'////////// LAST SETTINGS
```

Figure 20b

MainPreAuthorizeAnlitJavaActions30SecTimeOut
    Set up java permition for future sessions of the AutomaticRepair.com MainPreAuthorizeIExploreToSendData5SecTimeOut 'MainPreAuthorizeIExploreToSendData 'MainPreAuthorizeIExploreToEnterSecureArea 'MainCleanUpRegistryAndStartUp If (ARComNetworkDriveServerIP <> "") Then MainConnectNetworkDrives If (ARComNetworkPrinterServerIP <> "") Then MainConnectNetworkPrinters CurrentAnimationModule = 6
    Set specific graphical interface for current step of the process.

MainSetInitialResolution
    Change resolution to whatever user had before the process was initiated.

MainDisplayThankYouMessage
    Display last message of graphical interface

End Sub

Figure 20c

PROCESS FOR AUTOMATIC & UNATTENDED FORMATTING AND RE-INSTALLATION OF OPERATIVE SYSTEM, OS UPDATES, DRIVERS AND RE-INSTALLATION OF SOFTWARE APPLICATIONS, LAUNCHED FROM A WEBSITE AS A DIGITAL SERVICE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to a process for updating and re-installing software and particularly to a process for updating and re-installing software from a remote location.

2. Description of the Prior Art

Today, personal computers have become a mainstream business. Millions of computers are used in homes and offices throughout the world. As with any complex technology, operational problems arise. Software can become corrupted; invaders such as viruses and worms threaten computers everyday. When a computer goes bad because of a software problem repairs are needed. Computers and software are expensive. It is often difficult for an individual who is not experienced to repair these machines. Typically, they must be brought to a repair center, which not only costs money, but also deprives the user from computer access for the period of the repair.

BRIEF DESCRIPTION OF THE INVENTION

The instant invention is a software/website system that allows a user to resolve software-related problems on his/her PC (such as viruses, worms, and glitches) remotely via a web site produced as part of the invention. The invention then uses a software package that automatically erases (formats) the contents of the computer's hard drive and then automatically reinstalls the Operating System and all requested applications in a fully unattended way.

The system first runs hardware and software diagnostics on the user's computer. This determines the hardware's compatibility with the "Auto Setup" function. It also displays a comprehensive list of the Operating System and all applications the subject computer currently has installed. The website then displays a list of software available for installation through the website as part of the service. The user can select from that list the applications he/she wishes to have installed. For copyright purposes, the website asks the user for the selected software's license number or requires the user to purchase licensing for new software. The user-friendly navigation of the website allows the user back up important data and then proceeds to download the "Auto Setup" module to the subject computer for use. Upon execution, the program goes through an automated process during which it reformats the hard drive and reinstalls the required/requested software. It then installs any important supplemental applications needed to create a complete and functional PC. The Auto Setup module need not be attended to by the user. The operation is transparent to the user. The result is a computer that is restored to optimal performance without the services of a computer technician and very little effort on the user's part.

BRIEF DESCRIPTION OF THE DRAWINGS

FIG. 3 is a screen shot of the information summary screen for a typical account.

FIG. 8 is a screen shot of the software serial number verification page.

FIG. 9 is a screen shot of a sample available software installation selection page.

Figure 10:
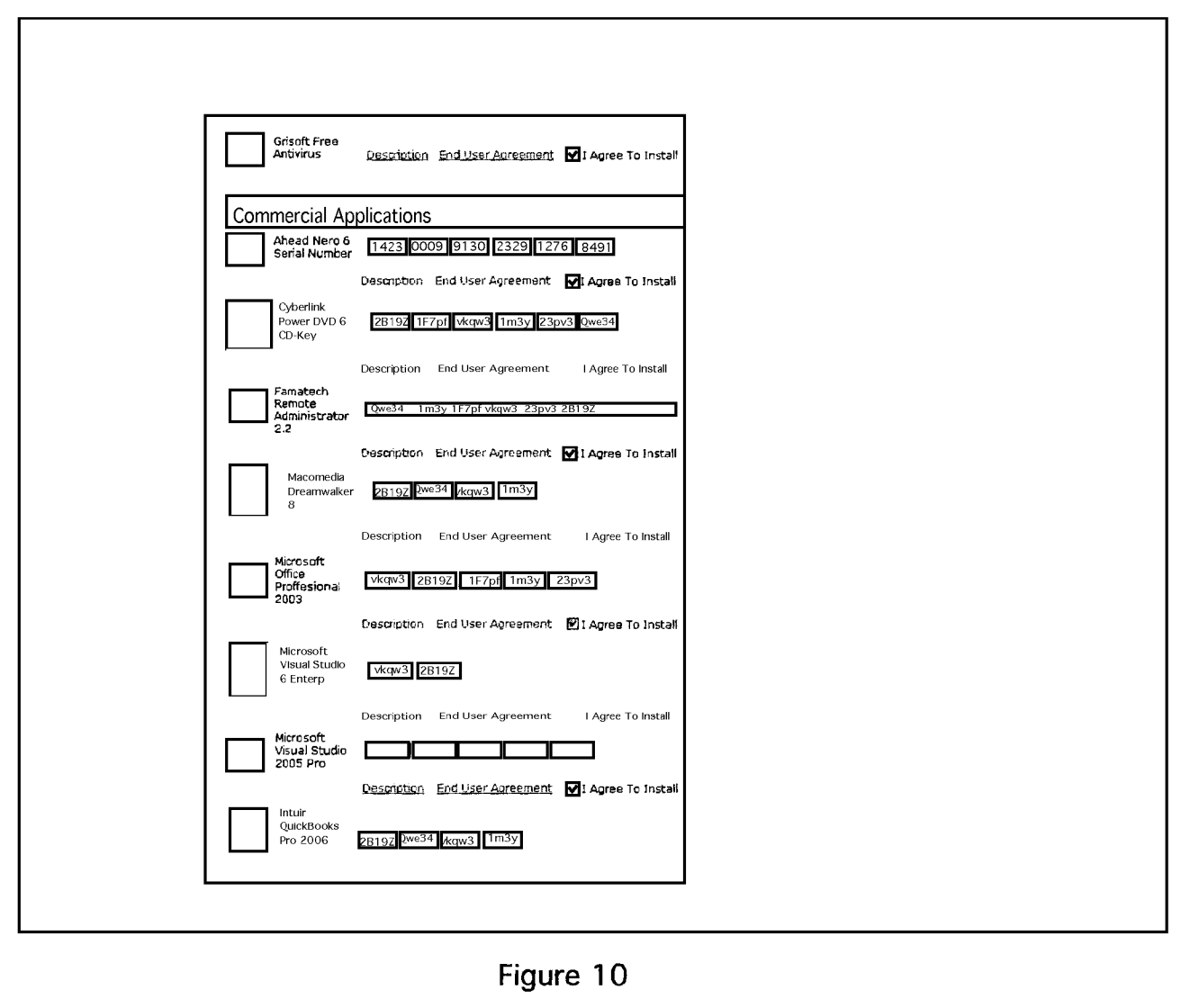

FIG. 10 is a screen shot of a sample available commercial software installation selection page, showing samples of the required software keys.

FIG. 12 is a screen shot of a sample summary page for software selection.

FIG. 13 is a screen shot of a sample continuation sheet of the summary page of FIG. 12.

FIGS. 17a-e are a listing of the instructions for the CD Compiler Module.

FIGS. 18a-d are a listing of the instructions for the System Setup Module.

FIGS. 19a-d are a listing of the instructions for the Application Module.

FIGS. 20a-c are a listing of the instructions for the final software installation module.

DETAILED DESCRIPTION OF THE INVENTION

Figure 1:
FIG. 1 is a screen shot of the initial login page.
Figure 2:
FIG. 2 is a screen shot of the information collection screen.
Figure 2A:
FIG. 2a is a screen shot of the information collection screen showing sample information in the fields.

The system operates a number of programming modules that are accessed by the user through a website. This website runs off of a large network of servers that can properly accommodate large amounts of software and is able to store software licensing information. The website is designed with user-friendly, customer service oriented navigation. FIGS. 1-4 are screen shots of the website that show the registration and login processes. FIG. 1 is a screen shot of the initial login page. Here, a new user clicks on the link marked "New User Register Here" at the top of the page. This takes the user to the screen shown in FIG. 2. Here, the user fills in the fields with the required information. FIG. 2a is a screen shot of the information collection screen showing sample information in the fields. FIG. 3 is a screen shot of the information summary screen for a typical account. This screen also has links on the bottom that allow a user to edit the information, return to the main site, order products and to log out of the system.

Figure 4:
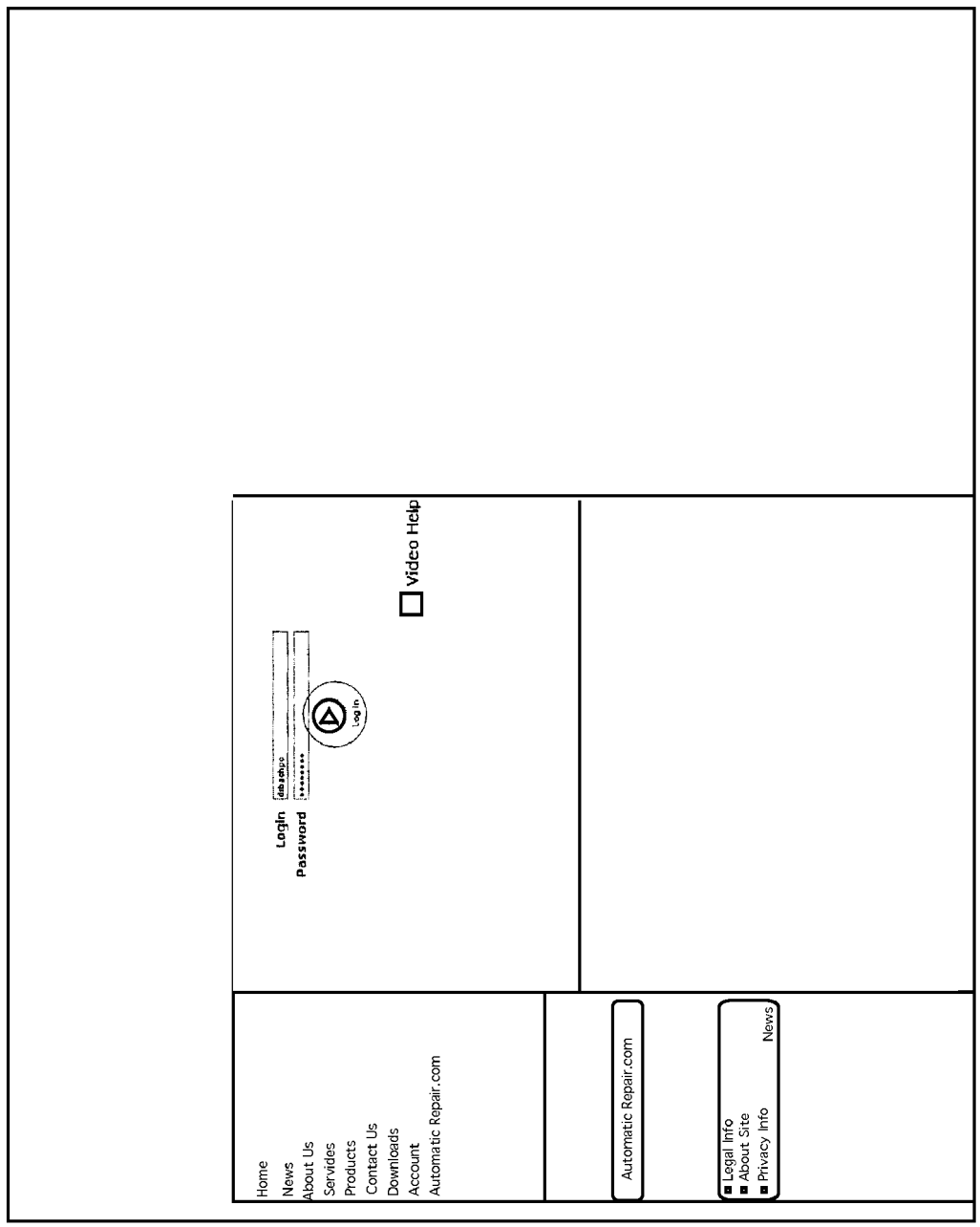
FIG. 4 is a screen shot of the initial login page showing a sample entry for a registered user.
Figure 8:
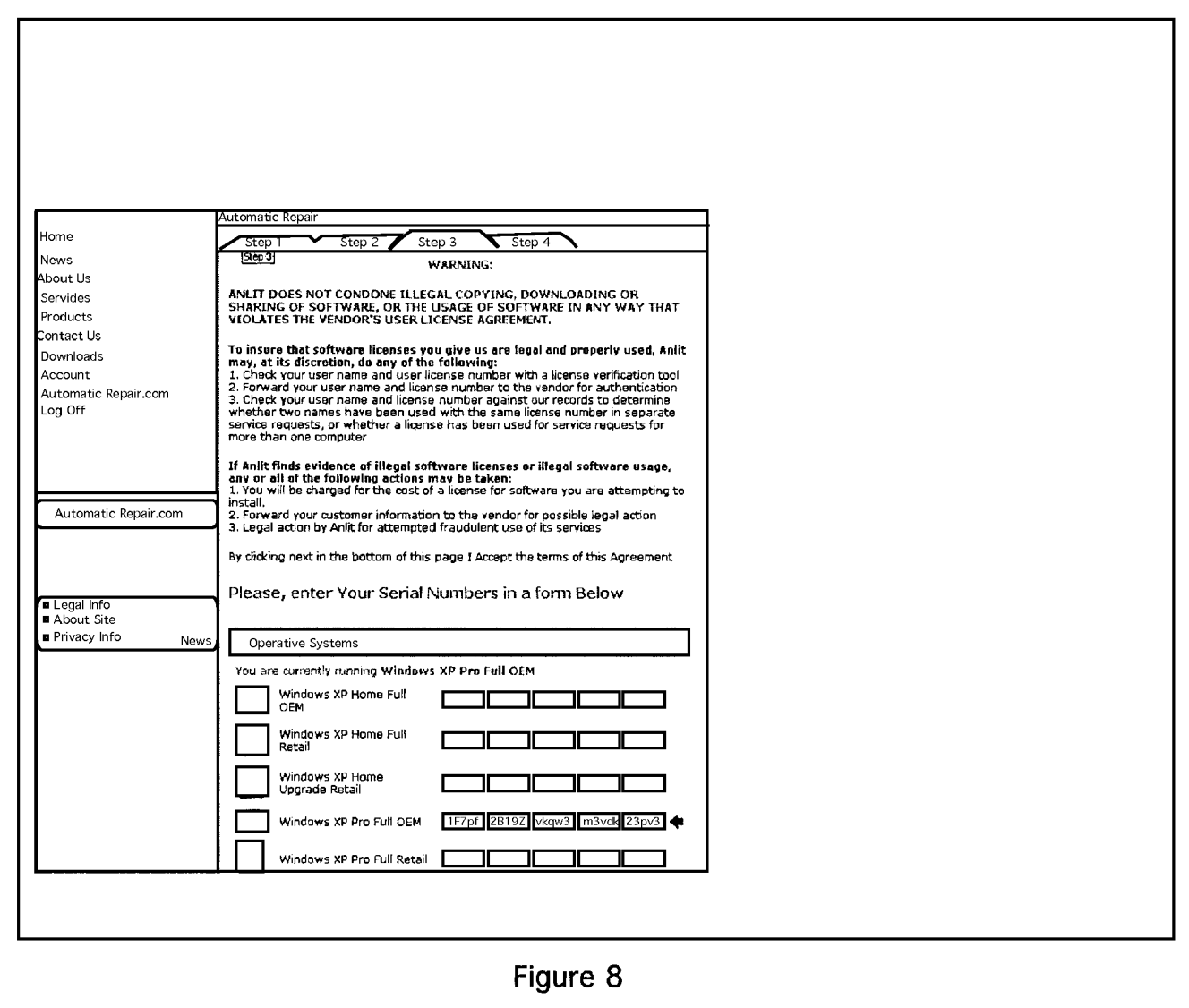

FIG. 4 is a screen shot of the initial login page showing a sample entry for a registered user. Here, the user has filled in the login and password blocks and can then click on the login button to gain access to the system. The system also reviews the software for licenses, as shown in FIG. 8.

Figure 5:
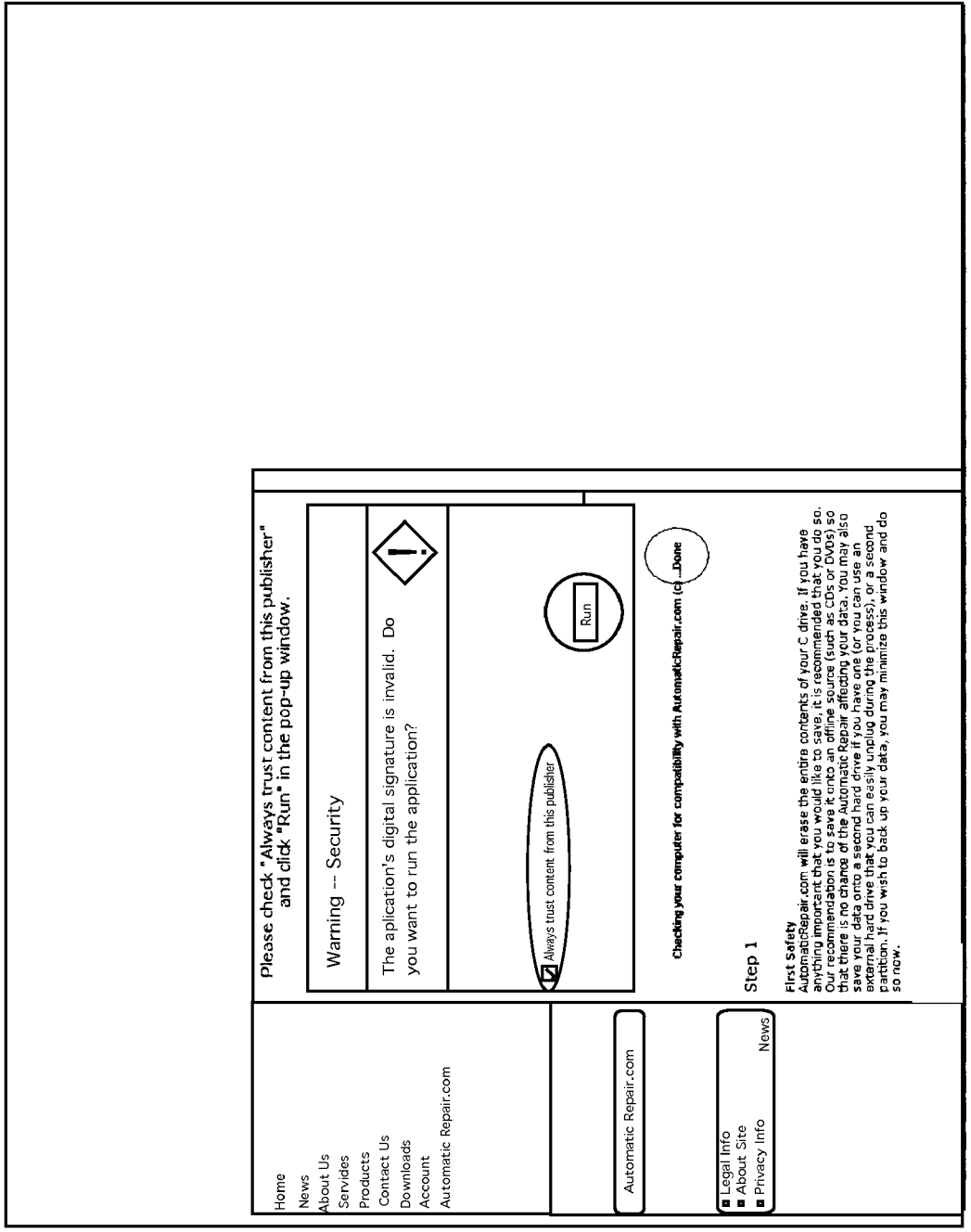
FIG. 5 is a screen shot of the initial repair page.

FIG. 5 is a screen shot of the initial repair page. This screen is used to verify compatibility with the system and to warn the user about the process. The first thing the system does is to download and install a module to the subject computer that automatically searches for the type of Operating System and applications currently installed. FIGS. 17*a-e* are a listing of the instructions for this "CD Compiler Module."

Figure 6:
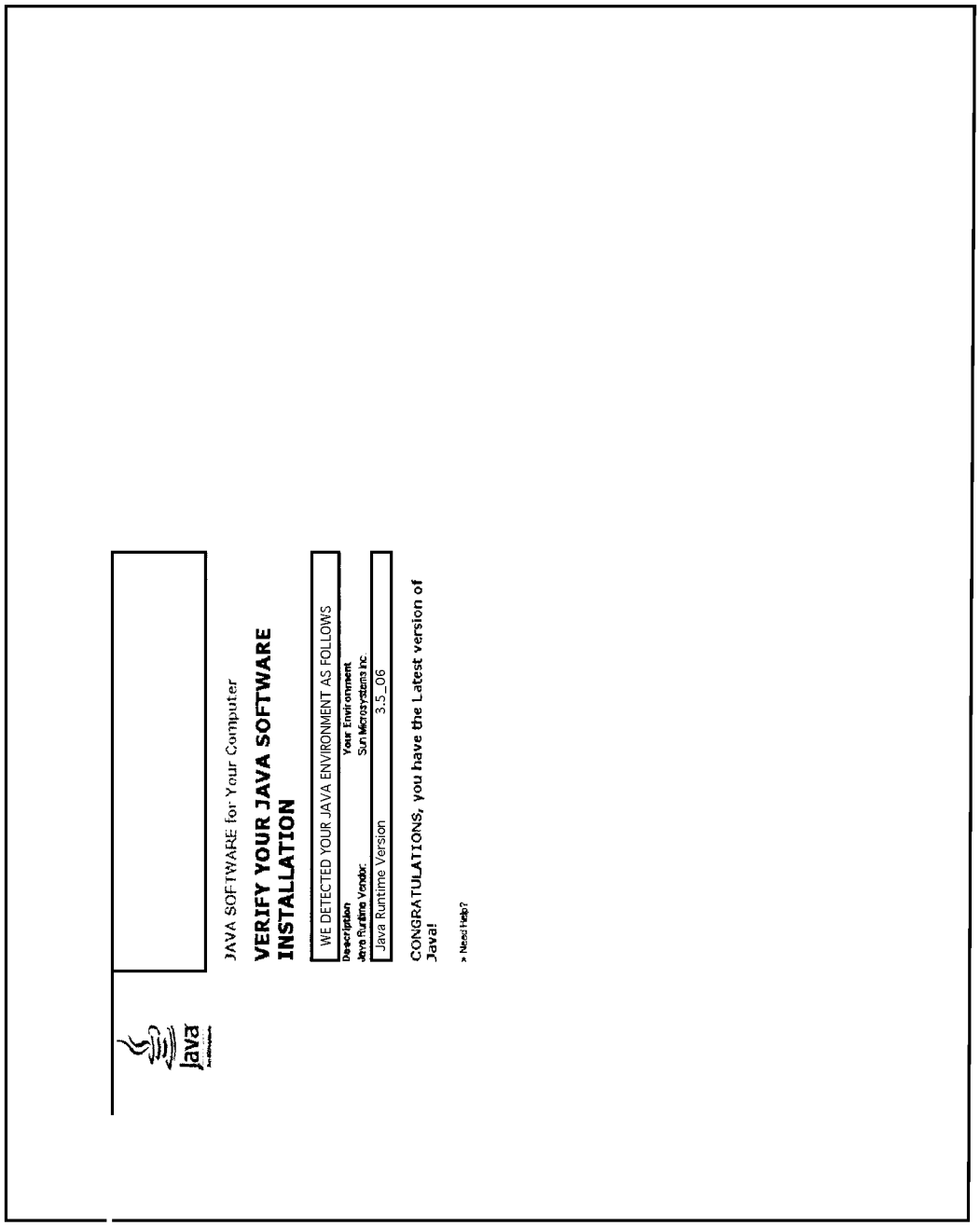
FIG. 6 is a screen shot of the JAVA verification page.
Figure 7:
FIG. 7 is a screen shot of the Internet compatibility verification page.
Figure 11:
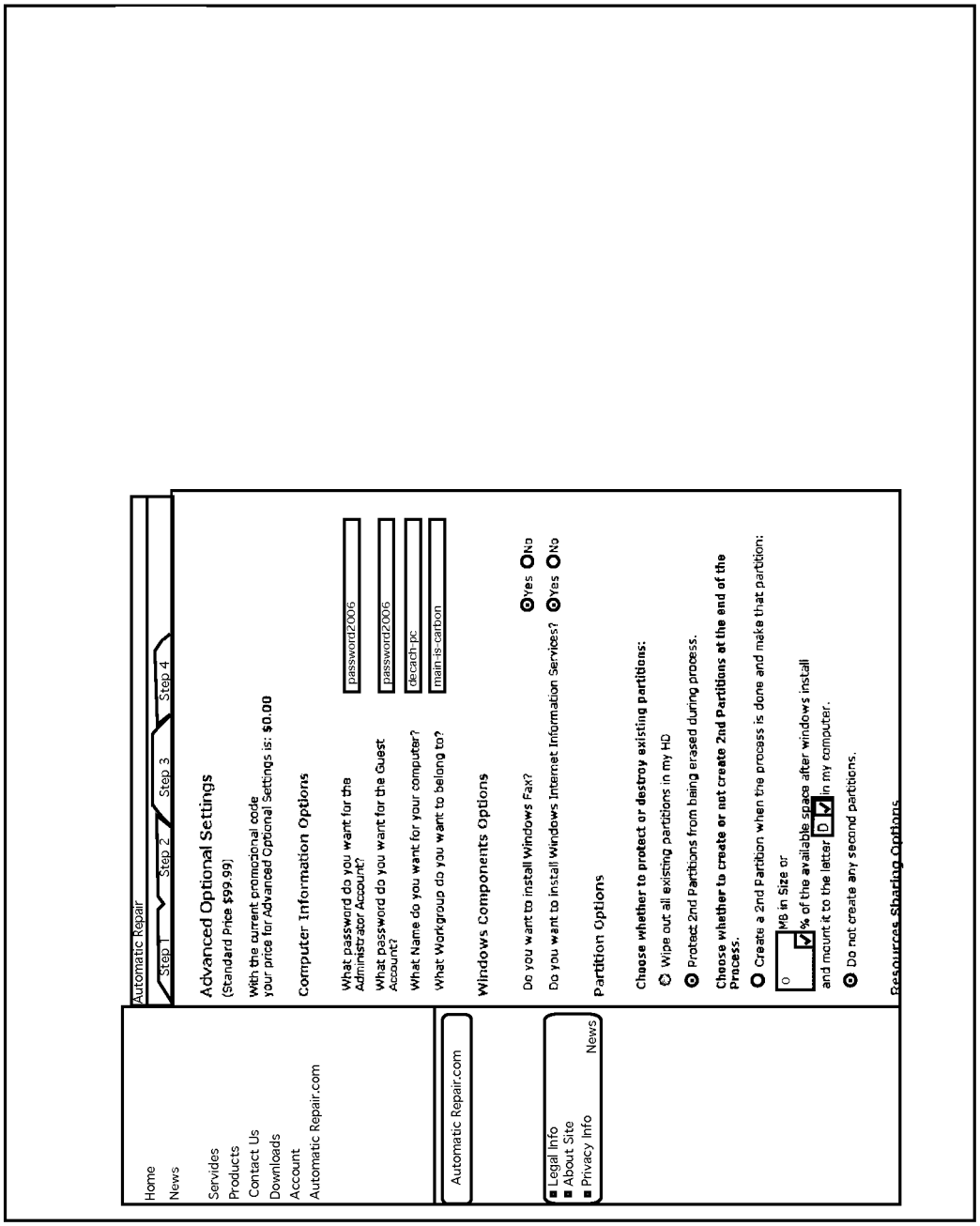
FIG. 11 is a screen shot of the advanced optional settings selections.

This module also runs diagnostics on the hardware installed in the computer. This way, the system can automatically let the user know when the "Auto Setup" module is incompatible with the user's hardware, e.g., FIGS. 5 and 6. FIG. 7 shows a screen shot that verifies Internet compatibility.

Just as important, if a user later chooses to select upgraded software, the system can send a warning if the subject computer's hardware does not meet the requirements for supporting the new software.

When the software finishes the diagnostics, it posts an easy-to-read list of software and hardware that the user already has on his/her computer. It also presents a separate list of the programs available through the service that is available for reinstallation. The user selects from that list the programs he/she would like to have reinstalled. The website then asks the user to enter the product license numbers for the software (based on the presumption that keeping license numbers is the responsibility of the owner). These steps are shown in FIGS. 9-13.

Without proper license numbers, the user must purchase new licensing for the software.

Step 2

In addition to selecting software applications that the user already has, the user may choose to upgrade by selecting a new or updated application. See, e.g., FIG. 11. The website has a list of software available for such a selection. When the user selects each new program, they are in essence purchasing a new program directly from the proprietor through the website at the proprietor's asking price. New license numbers are assigned concurrent with the new software. After the user has decided to upgrade, the link to continue asks the user to fill out a small online application with information including credit or debit card number and expiration date. The total charges include the standard service fee and any additional upgrades of software purchased. Once the transaction has been processed and approved, the data backup process can begin. All of the aforementioned purchased software is automatically installed along with the reinstallation of the current OS and software as part of the process.

Step 3

Figure 14:
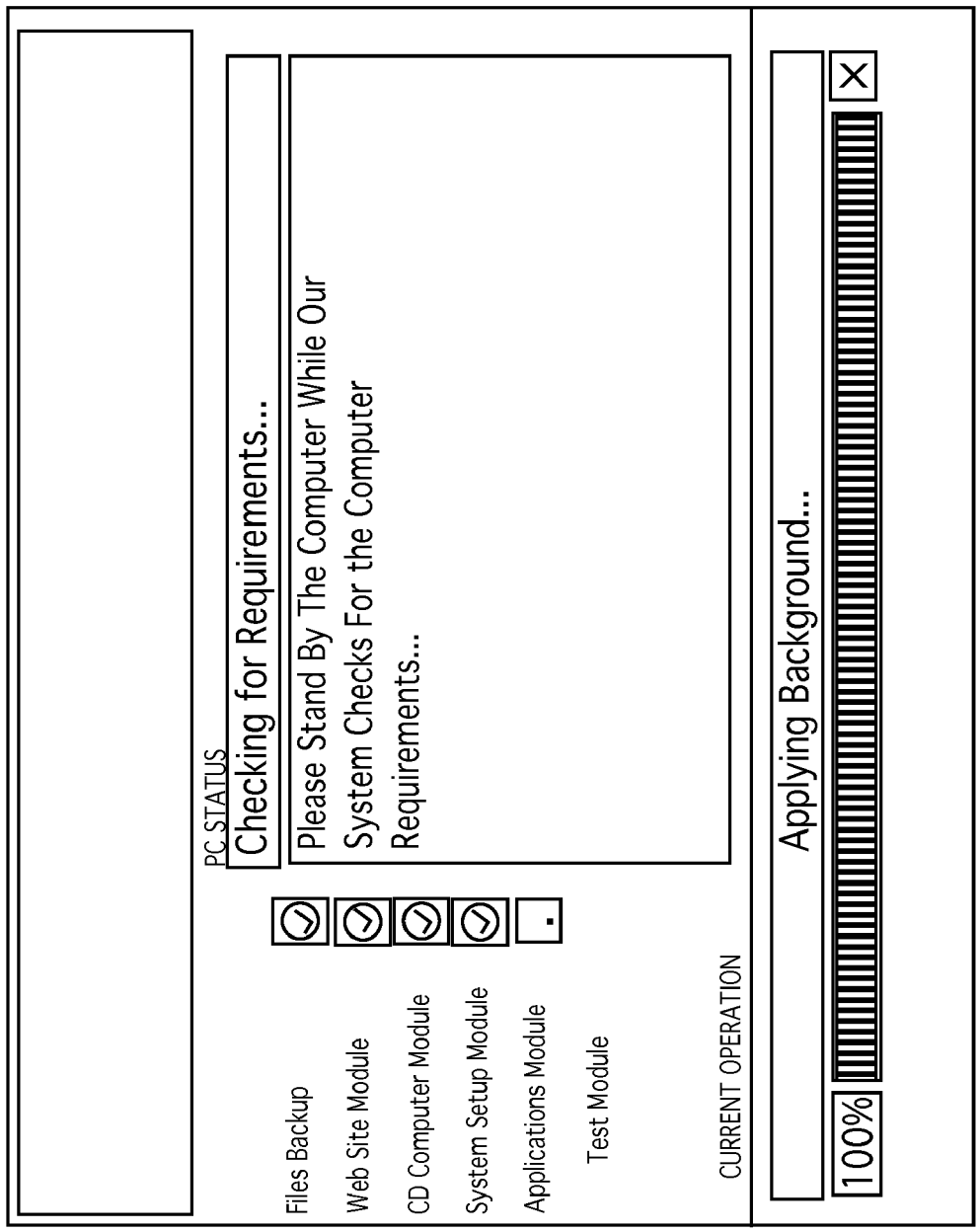
FIG. 14 is a screen shot of the systems check page showing the "applying background" step.
Figure 15:
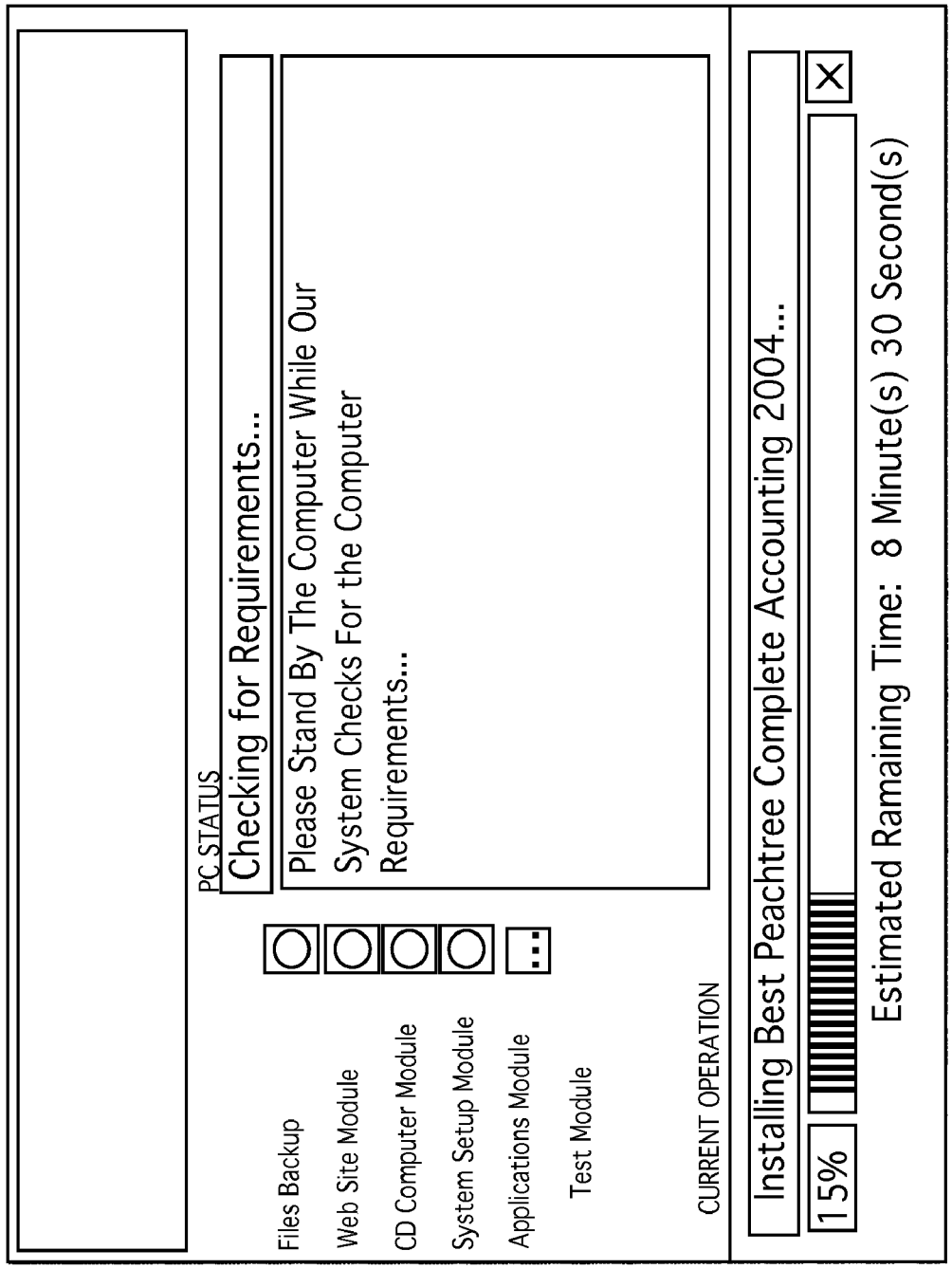
FIG. 15 is a screen shot of a sample installation page showing time to complete.

Most people have some kind of important files on their hard drive: work, photos, e-mails, etc. Data backup is part of computer maintenance. It should be practiced during the course of the computer's life. Therefore, the system allows a user to conduct last minute data saving before downloading the Auto Setup module. See, e.g., FIG. 14. A credit card purchase of the program prompts two options for the user. In option 1, the user can save important data his/herself or in option 2, the user can select important data needed to be backed up and the system does it for the user. If the user chooses the first option, the downloading process need not yet be initiated, the website can be minimized, and the user can go in through Windows Explorer or similar program and move data to a separate drive or shared network. If the user selects #2, the system provides a pop up a browser that the user can go through and select designated files that will be automatically moved to either an available separate drive, shared network, or even stored on the company's server temporarily. When the user is finished, he/she can begin the downloading process.

Step 4

The website then allows the user to download the "Auto Setup" module to their computer. A link brings the user to a downloading window where it will stay until the program is finished downloading. Once it is finished, the system asks the user where they want the program to be saved. The user selects the desktop and closes the window. The user must also install a blank CD in the CD drive. This CD is used as part of the operation.

Once the program is on the desktop, the user only has to double click on the Auto Setup icon to execute the program. Note that the steps of this portion of the system are shown in FIGS. 18*a-d*. The rest is completely automatic. First, Auto Setup disables the user from interacting with the computer. The user can tap on the keyboard and click on the mouse and nothing happens. The program will not allow any interruptions or mishaps while the program is doing its job. The user can then walk away from the computer and leave it for a few hours.

Next, Auto Setup goes through the hard drive and uninstalls all of the software. All Operating System/s, programs, applications, updates, patches, and anything else that happens to be on the designated drive are completely erased. The resulting hard drive is a clean slate, a blank hard drive (other than BIOS setup) to prepare the computer for the new installation.

Step 5

While reformatting the computer's hard drive, Auto Setup goes through the steps of reinstalling a new Operating System that are normally performed by a human being. These steps are listed in FIGS. 19*a-d* and 20*a-c*. For example, with Windows XP, the software selects all the installation options that are standard for a home PC user. Once the basic installation of the OS is complete, the program automatically reboots the computer to finish.

Figure 16:
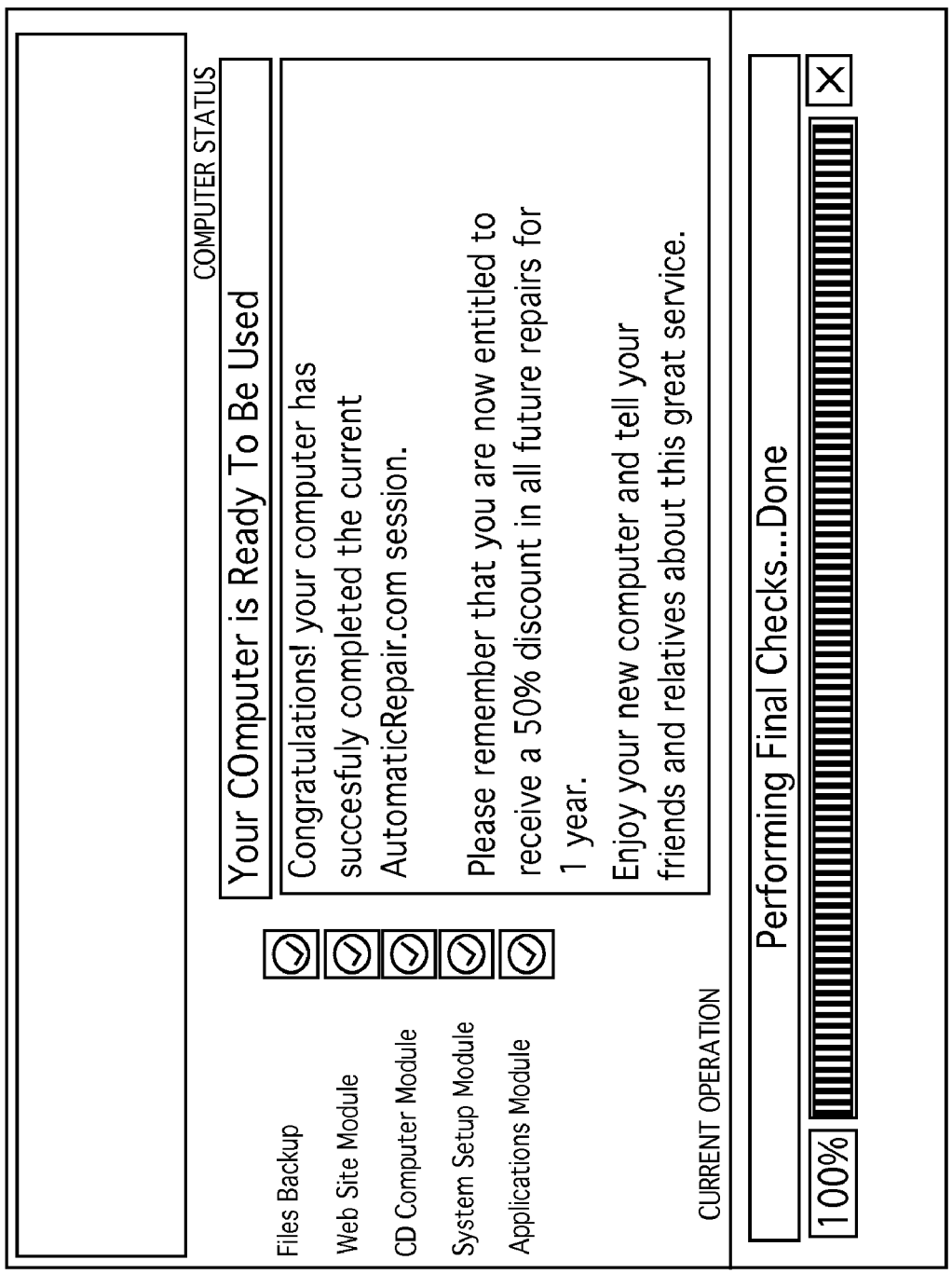
FIG. 16 is a screen shot of a sample completion page showing the service is complete.

When rebooted, a window appears letting the user know how much time is left for installation as it goes through a list of current and upgraded applications to reinstall. All programs needed for a complete and functional PC are automatically installed. Within the last hour, the program does some finishing touches such as updating or installing program patches. It then prompts a message to the user that it has finished and enables the user to interact once again with the keyboard and mouse. See FIG. 16. The result is a computer that performs at optimal speed and efficiency and with little to no effort on the user's part.

Technical Explanation

The user visits the website and decides to have his or her computer fixed using the service.

The User Initiate a common registration process, where his basic information and payment information is collected in the main-server (SQL Server Based).

The User follows a wizard that allows the server to collect the Registration Numbers of the commercial software that the user would like to have re-installed.

The Server Authenticates His Payment Information and Authorize the Download of an Applet that will trigger the download of the initial software images, and the download of a file containing the mentioned serial numbers.

The Applet will wait until all the files are downloaded and then it will execute one of the files.

This File is a Self-Extracting Compressed file that will place the necessary files in the hard drive and then launch an application that will automatically install the burning software on the machine.

The Application will Collect all the device drivers and save them for future use.

The specific operating steps for this are shown in appendix A

The Application then will launch and control the burning software to record the image files in the blank CD placed in the CD-Burner Unit, and then it will re-open the Burning software and record the file containing the serial numbers in the same CD.

Then the same Application will wait for all the burning processes to complete and to verify that the CD was recorded properly, and it will proceed to install another application that is used to manipulate master boot tables of the computer.

The Application will wait for this installation to be finished and then it will launch the Master-Boot Manipulating Software and Proceed to Delete the Main Drive Boot Information, forcing the computer to boot from the CD Drive in the next reboot without the need of user intervention.

The Computer will boot from the CD, where a fully unattended installation of the operating system, with the previously inputted serial number, formats the drive and proceeds to install the operating system.

The CD structure and code is placed in such form that when the OS Installation is finished it launches another application that installs the necessary OS updates to have the computer running in a more stable state.

After those updates are installed, the application connects to the Internet to connect with the main-server to report that this stage is completed, verify that the user had permission to run the CD and proceed to download the remaining applications.

After the downloads are completed, the application runs an automatic series of scripts to install all the applications automatically, using the serial numbers initially provided by the website wizard.

When the process is finished, the application runs a series of processes to adjust the appearance and performance of the machine leaving it working at a maximum level.

Then a notice is given to the user that the process is complete.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method for automatically repairing a user's computer having a keyboard, a mouse and hard drive with a plurality of software programs installed thereon, from a remote location comprising the steps of:
    a) having the user log onto an Internet website having a server;
    b) having the user register on the website to create an account;
    b) using a software package that creates a database on a remote website server, of the user's computer systems and files including an operating system, all files, and all applications for the user's specific account;
    c) having the software upload serial numbers, and identity keys for all of the user's applications stored on the user's computer, to the database on said website server;
    d) offering the user the opportunity to upgrade the user's program versions, if desired;
    e) asking if the user wants the system to perform a back up of all files;
    f) performing the repair process having the following sub processes:
        i) taking information from the user's account and downloading a clean copy of the user's operating system and applications to a remote storage device;
        ii) erasing a user's hard drive located on said user's computer to remove the entire contents of the hard drive;
        iii) installing the operating system from the remote storage device onto the user's clean hard drive;
        iv) accessing the account information from the database to download programs and pertinent software information from the database; and
        v) installing all applications, settings and files onto the user's computer; and
    g) notifying the user that the process is complete and the computer is ready to use.

2. The method of claim 1 wherein the remote storage device of step f(iii) is a compact disk.

3. The method of claim 1 wherein the remote storage device of step f(iii) is a digital videodisk.

4. The method of claim 1 wherein the remote storage device of step f(iii) is a safe partition on the user's hard drive.

5. The method of claim 1 wherein step f(i) is called the pre-cd phase.

6. The method of claim 1 wherein step f(iii) is called the post-cd phase.

7. The method of claim 1 wherein step d further comprises the steps of:
    a) ascertaining if the user wishes to upgrade any software;
    b) allowing the user to purchase any new software upgrades the user desires; and
    c) storing the information regarding the upgraded software in the user's account database.

8. The method of claim 7 wherein step f(v) further contains the steps of:
    a) reviewing the user's account database;
    b) selecting a set of software upgrade packages from the website server that the user has purchased; and
    c) replacing a portion the user's original software applications with the set of upgrade software application packages that the user has purchased when installing all applications, settings and files onto the user's computer.

* * * * *